Dec. 22, 1959   W. PEREZ   2,918,561
THERMAL HEATING DEVICE
Original Filed April 9, 1953

INVENTOR
WILLIAM PEREZ
BY
Moses, Nolte, & Nolte
ATTORNEYS

United States Patent Office 2,918,561
Patented Dec. 22, 1959

2,918,561

THERMAL HEATING DEVICE

William Perez, Mineola, N.Y.

Original application April 9, 1953, Serial No. 351,285, now Patent No. 2,835,480, dated May 20, 1958. Divided and this application January 21, 1958, Serial No. 710,353

6 Claims. (Cl. 219—41)

This invention relates to thermal devices and more particularly to heating or cooking apparatus utilizing thermal pins for heating or cooking a mass which may be in solid or liquid form.

This invention is a division of my co-pending patent application Serial No. 351,285, filed April 9, 1953, now Pat. No. 2,835,480.

It is an object of the present invention to provide novel heating pins or thermal elements adapted to be inserted in the mass to be heated or cooked.

Another object of the invention is to provide novel thermal pins for heating or cooking a mass by inserting the thermal element into the exterior of the body to be heated or cooked, said thermal element including a unitary structure having the heating element per se associated therewith or confined within a unitary housing and including fluid means to facilitate heating of the mass.

Another object of the invention is to provide a unitary thermal element including a housing having fluid means therein to be heated by an isolated heating element within the container.

Figure 1:
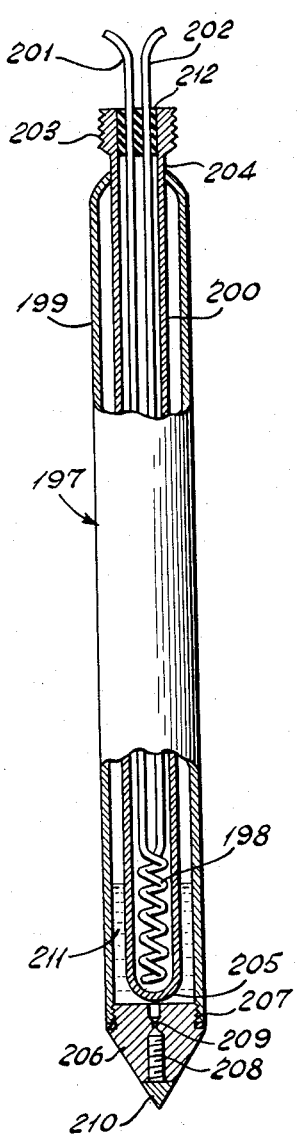
Figure 2:
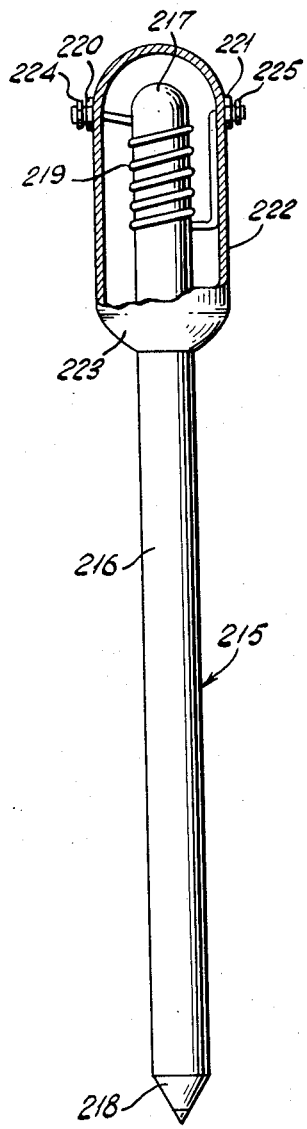

Other and further objects of the invention will be apparent from a perusal of the following detailed descriptions taken in connection with the accompanying drawings, in which:

Fig. 1 is an elevational view of a thermal element or pin in which an enclosed heating element is extended into one end of the pin to evaporate the liquid and wherein the pin is adapted for securement to a handle so that the pin may be thrust by hand into a liquid or mass desired to be heated, portions of the pin being broken away at the opposite ends thereof to show the interior construction of the pin;

Fig. 2 is an elevational view of a still further form of a thermal element or pin wherein one end of the pin is heated by an electric heating coil surrounding the pin and with terminals being provided on a casing for the connection of electric wires for the conducting of electric current to the heating element.

Referring to the drawings and more particularly to Fig. 1 there is shown one form of the invention in the form of a heating pin 197 that carries its own heating element 198 and which is adapted to be connected to a handle or other support so that it can be portable and easily thrust into a body of liquid to be heated or even into an edible mass for the purpose of cooking the same from the interior thereof. This heating pin or prod 197 includes an outer tube 199 and an inner tube 200 that contains the heating element 198 and wires 201 and 202 extending thereinto. This inner tube extends out through the end of the outer tube 199 and has a threaded enlargement 203 by which the tube 197 can be fixed to a handle or to a plate support, not shown. The outer tube is welded about the inner tube 200 as indicated at 204 so as to maintain the vacuum in the liquid container or outer tube. The lower end of the inner tube is closed as indicated at 205 and the heating element 198 is disposed therein.

The lower end of the outer tube is closed in any convenient manner but may be closed by means including a valve plug 206 welded to the outer tube 199 as indicated at 207. After the air is evacuated from the outer tube 199, a needle valve element 208 is tightened in a threaded central opening against a seat 209 thereof. On the head of the plug there is welded a pointed closure 210 to make certain that the pin 197 is effectively hermetically sealed. A small body of liquid 211 which will become heated by the heating element 198 and the vapors thereof will extend along the upper portion of the tube 199 so as to heat the wall thereof and the mass into which the pin 197 has been thrust. The wires 201 and 202 extend through an insulating element 212 in the threaded enlarged end 203 of the inner tube 200. These wires can be connected by means of a plug and cable with any electrical outlet.

In Fig. 2 there is shown a still further form of the invention comprising a heating pin with a heating element surrounding one end of the pin. This heating pin is indicated generally at 215 and comprises a tube 216 closed at one end as indicated at 217 and at the other end with a valve plug arrangement 218 similar to the valve plug arrangement which may be shown in Fig. 1.

Surrounding the closed end of the tube 217 is a heating coil 219 having its ends connected respectively with terminals 220 and 221 fixed to an outer casing 222 fixed over the end 217 of the tube 216 and secured to the exterior of the tube 216 at its open end 223. Wires can be attached to the respective terminals 220 and 221 by tightening the respective nuts 224 and 225. From such wires the pin 215 can be supported in a liquid or the pin can be thrust into a meat mass and supported by the mass. Internal cooking of the meat mass would be effected.

It should now be apparent that there has been provided various showings of the present heating arrangement wherein the pins are unitary, but which may be adapted for connection with other pins or supports, in cooking vessels, in an industrial tank, or adapted for hot plates or ovens. It will also be apparent that the invention has application for use with thermal pins adapted to be connected to a handle so that the pin unit can be used in a heating prod and with the heating element contained in the same.

In all of these pins, substantially all air and other gases will have been evacuated from the tube and there remains only the liquid and its vapors within the tube. When the tube is heated sufficiently, the liquid is evaporated so that its vapors rise and the latent heat of these vapors is transmitted to the wall of the tube and taken away by the material or medium to be heated surrounding the upper end of the tube.

From the foregoing, it will be seen that there is provided a thermal heating unit which includes a unitary structure having a heating element per se associated therewith, the heating element may be confined within a unitary housing having the fluid means therein to facilitate the heating of the mass, or the thermal element may be disposed exteriorly of said unitary housing. It is to be noted that, in both Figs. 1 and 2, the electrical heating element is an envelope separate from the envelope containing the liquid or fluid to be vaporized.

While changes may be made in the detail construction, it is to be understood that such changes may be made without departing from the spirit and scope of the present invention, as defined by the appended claims.

What is claimed as new and desired to be secured by Letters Patent of the United States is:

1. A thermal device for aiding heating of a mass comprising a hermetically sealed tube shaped for insertion into a mass to be heated, said tube being at least partially evacuated of gases and containing a small volume of liquid which will vaporize when a first area of the tube in which the liquid has settled is heated to a predetermined temperature, and such that the vapors conducted to a second area of the tube will condense to give off their latent heat when said second area of the tube is contained in a mass having a sufficiently lower temperature, and electrical heating means carried by said hermetically sealed tube and being disposed in relation therewith to heat said small volume of liquid.

2. A thermal device for aiding the heating of a mass as set forth in claim 1, wherein said electrical heating means is disposed internally of said hermetically sealed tube.

3. A thermal device for aiding the heating of a mass as set forth in claim 2, wherein said heating means includes a heating element having electrical terminals disposed externally of said sealed tube for connecting same to a source of electrical energy.

4. A thermal device for aiding the heating of a mass as set forth in claim 3, wherein said heating means includes an envelope for said heating element.

5. A thermal device for aiding the cooking of a mass as set forth in claim 1, wherein said electrical heating means is disposed externally of said hermetically sealed tube.

6. A thermal device for aiding the heating of a mass as set forth in claim 5, wherein the heating means which is disposed externally of said hermetically sealed tube, and said hermetically sealed tube per se, are both disposed within an outer envelope, and electrical terminal means carried by said outer envelope connected to a source of energy for energizing said heating means.

References Cited in the file of this patent

UNITED STATES PATENTS

| | | |
|---|---|---|
| 403,110 | Johnson et al. | May 14, 1889 |
| 1,178,777 | Apfel | Apr. 11, 1916 |
| 1,238,124 | Frickey | Aug. 28, 1917 |
| 2,049,838 | Haussauer | Aug. 4, 1936 |
| 2,350,429 | Troupe | June 6, 1944 |
| 2,820,134 | Kobayashi | Jan. 14, 1958 |